United States Patent [19]
Turesson

[11] 3,901,457
[45] Aug. 26, 1975

[54] ARRANGEMENT IN CENTRIFUGAL BRAKES FOR FISHING REELS

[75] Inventor: Karl Ture Ingvar Turesson, Svangsta, Sweden

[73] Assignee: ABU Aktiebolag, Svangsta, Sweden

[22] Filed: June 28, 1972

[21] Appl. No.: 267,095

[30] Foreign Application Priority Data
July 5, 1971   Sweden.............................. 8687/71

[52] U.S. Cl........................................ 242/84.52 C
[51] Int. Cl.²........................................ A01K 89/02
[58] Field of Search................... 242/84.52 C, 84.5

[56] References Cited
UNITED STATES PATENTS

| | | |
|---|---|---|
| 2,290,662 | 7/1942 | Willison ..................... 242/84.52 C |
| 2,489,447 | 11/1949 | Borgstrom................... 242/84.52 C |
| 3,111,287 | 11/1963 | Baenziger................ 242/84.52 C X |

Primary Examiner—Billy S. Taylor

[57] ABSTRACT

A centrifugal brake for fishing reels has a fixed brake drum and centrifugal weights slidable on radial pins rotating with the line spool. The radial pins are attached to a hub ring which in turn is driven by the spool shaft by a diametrical pin therethrough engaging a diametrical slot in the hub. The slot has an axial portion narrower than the diameter of the pin and the hub is made of resilient material, whereby the hub is retained in axial location on the spool shaft after being pushed on the shaft. The diametrical pin is also used for driving the line spool.

5 Claims, 2 Drawing Figures

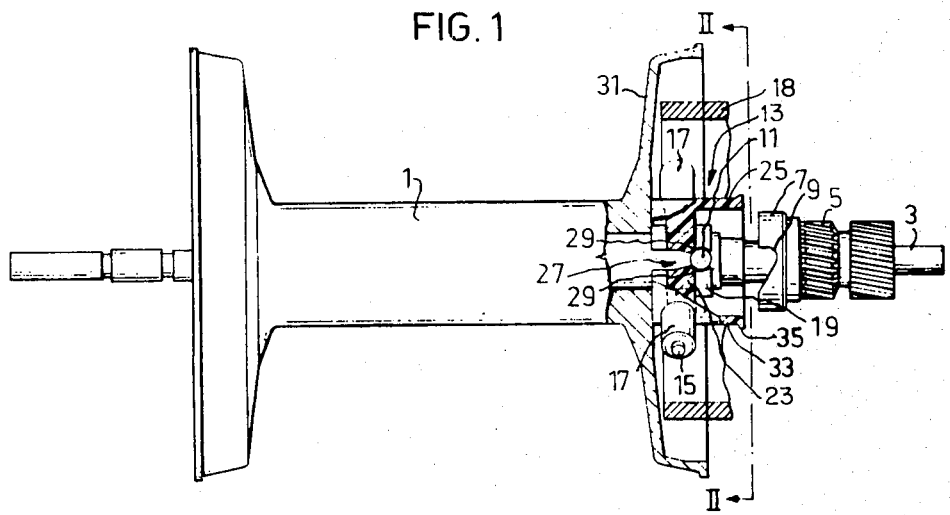
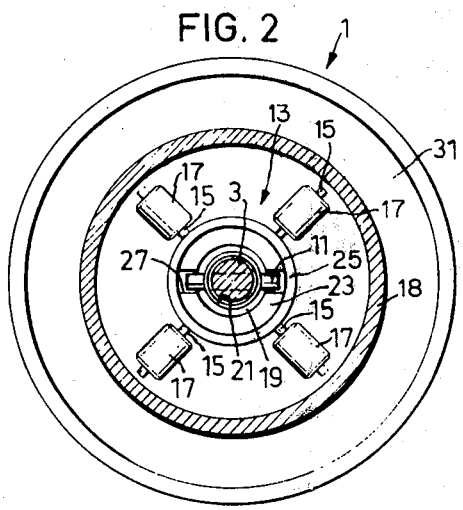

ARRANGEMENT IN CENTRIFUGAL BRAKES FOR FISHING REELS

The present invention relates to a centrifugal brake arrangement for a fishing reel comprising a line spool with co-rotating spindle to which radial pins are non-rotationally connected and on which pins centrifugal weights are arranged for movement therealong under the influence of centrifugal force into abutment with a brake drum fixedly mounted externally of the extremities of the pins. With such a centrifugal brake arrangement, the guide pin for the centrifugal weights is in the form of a peg extending diametrically through the spool spindle. This construction has certain disadvantages when it is desired to increase the braking force, which is a requirement placed on large fishing reels. For the purpose of increasing the braking force, it is possible to enhance the centrifugal force by increasing the diameter of the brake drum, although this is not desirable for space reasons. An increase in the braking force can also be obtained, by increasing the number of centrifugal weights, although with the known construction this would require the arrangement of two or more diametrical guide pins through the spindle, thereby weakening the spindle and considerably increasing the axial dimensions of the brake arrangement and the brake drum.

One object of the invention is therefore to avoid these disadvantages and to provide a centrifugal brake arrangement which permits the use of an arbitrary number of radial pins with centrifugal weights.

This is achieved by a centrifugal brake arrangement which is characterized in that the pins guiding the centrifugal weights are arranged in a brake hub non-rotatably connected to the spindle.

An embodiment of the invention will now be described with reference to the accompanying drawing, in which FIG. 1 illustrates in side view a line spool, partially cut away to show a brake arrangement according to the invention, and FIG. 2 illustrates the spool seen from the end along the line II—II in FIG. 1.

The fishing reel line spool 1 has fixedly connected thereto a spindle 3. Mounted on the right end of the spindle as shown in FIG. 1 is a gear wheel 5 and a coupling ring 7 forming part of the drive mechanism of the reel. The gear wheel 5 and the coupling ring 7 are arranged for axial movement on the spindle 3, to enable hook shaped recesses 9 on the ring 7 to be moved into engagement with a dog pin 11, arranged to pass diametrically through the spindle 3.

Also mounted on the spindle 3 is a brake hub 13 carrying four radial pins or staffs 15, on which centrifugal weights 17 are slidably arranged. When the brake hub 13 rotates, the weights 17 are thrown outwardly by centrifugal force and come into abutment with the inside of a brake drum 18, to slow down the hub by friction in a known manner. The brake hub 13 comprises an inner cylindrical body of resilient plastic material and has a centre portion 19 provided with a central bore 21 by which it is mounted on the spindle 3, an intermediate portion or spider 23 which encircles the centre portion 19, and an outer cylinder 25. The centre portion 19 and intermediate portion 23 are provided with a diametrical, axially extending slot 27 whose width is slightly greater than the diameter of the dog pin 11, whereby the brake hub can be pushed onto the spindle 3 with the pin 11 moving in the slot 27. On either side of the spindle, the slot 27 has a constricted portion 29, where the width of the slot is slightly less than the diameter of the dog pin 11. The distance between the constricted portion 29 and the end of the hub 13 facing the flange 31 of the line spool 1 is slightly less than the distance between the flange 31 and the dog pin 11. When placing the brake hub on the spindle, the slot will widen slightly at the constricted portion and snap back behind the pin 11 to retain the hub in position axially on the spindle 3.

The intermediate portion 23 of the brake hub is shorter axially than the centre portion 19 and does not reach over the dog pin. Thus, between the centre portion 19 and the cylindrical portion 25 there is formed a groove in which the ring 7 can be received so that its hook-shaped notches 9 can co-act with the dog pin 11.

The cylindrical portion 25 of the brake hub 13 has an extension 33 which extends away from the spool flange 31 and which is terminated with a radially outwardly directed drip flange 35. This arrangement permits the cylindrical portion 25 to collect any oil which might be thrown out from the gear wheel 5 or the ring 7 and to prevent the oil from being thrown onto the inner surface of the brake drum 18. Any oil which is thrown off will pass out radially from the drip flange 35, which is axially spaced from the friction surface of the brake drum.

What is claimed is:

1. An arrangement mounting centrifugal brake weights for a fishing reel comprising a line spool having a co-rotating spindle, a dog pin mounted transversely in said spindle for driving said spindle, drive means to drivingly engage said dog pin, a coaxial inner cylinder mounted about said spindle, a slot formed in said cylinder to engage said dog pin to rotate said cylinder therewith, said dog pin extending beyond said cylinder, an enlarged coaxial outer cylinder, a spider connecting said cylinders at a portion thereof displaced axially from said dog pin to permit engagement of said dog pin by said drive means, a plurality of substantially radially extending staffs extending from said outer cylinder, and brake weights slidably mounted on said staffs to move outwardly under centrifugal force when said spindle and said outer cylinder rotate.

2. An arrangement according to claim 1 characterized in that there are at least three radially extending staffs extending from said outer cylinder.

3. An arrangement according to claim 1 characterized in that the inner cylinder is made of a resilient material and that the slot in its centre portion has a constricted portion to snap over the dog pin to hold the inner cylinder in position axially.

4. An arrangement according to claim 1 characterized in that one end of the outer cylinder is provided with a radially outwardly directed flange-like drip edge for guiding excess oil from that end of said cylinder.

5. An arrangement according to claim 1, characterized in that the spider has an axial slot formed therein to allow said spider to be pushed over the dog pin during assembly and disassembly.

* * * * *